W. F. ZIMMERMANN.
MECHANICAL MOVEMENT.
APPLICATION FILED JUNE 7, 1907.

909,126.

Patented Jan. 5, 1909.

2 SHEETS—SHEET 1.

WITNESSES:
Edwin C. Thurston
H. Ezra Eberhardt

INVENTOR
William F. Zimmermann

W. F. ZIMMERMANN.
MECHANICAL MOVEMENT.
APPLICATION FILED JUNE 7, 1907.

909,126.

Patented Jan. 5, 1909.

2 SHEETS—SHEET 2.

WITNESSES:
Edwin C. Thurston.
H. Ezra Eberhardt.

INVENTOR
William F. Zimmermann

UNITED STATES PATENT OFFICE.

WILLIAM F. ZIMMERMANN, OF NEWARK, NEW JERSEY.

MECHANICAL MOVEMENT.

No. 909,126.

Specification of Letters Patent.

Patented Jan. 5, 1909.

Application filed June 7, 1907. Serial No. 377,712.

*To all whom it may concern:*

Be it known that I, WILLIAM F. ZIMMERMANN, of the city of Newark and the county of Essex, in the State of New Jersey, have invented a certain new and useful Mechanical Movement, of which the following is a specification.

The invention relates primarily to a mechanical movement whereby a shaft may be given one or more positive rotations, at any desired intervals, from a constantly rotating shaft.

The invention can be embodied in various forms of mechanism, for instance in an indexing mechanism, where it is desirable to positively index a given amount at any predetermined interval, attaching the said invention to any constantly rotating primary shaft.

The object of the present invention is to positively engage a shaft with a constantly rotating member for definite predetermined periods of time, to allow the said shaft to make one or more rotations before coming to rest, the said predetermined periods of time positively controlled by said shaft.

The invention comprises a driven gear, a driving gear secured to a primary shaft, driving said driven gear, a positive clutch disk mounted concentric with said driven gear, the said clutch disk secured to a secondary shaft, and mechanism to couple and uncouple said clutch disk or secondary shaft and said driven gear or primary shaft at any desired interval, and positive mechanism to control the said coupling and uncoupling mechanism, whereby the said secondary shaft is uncoupled from the said primary shaft at the termination of a predetermined interval, the said positive mechanism being controlled from the said secondary shaft.

Figure 1:
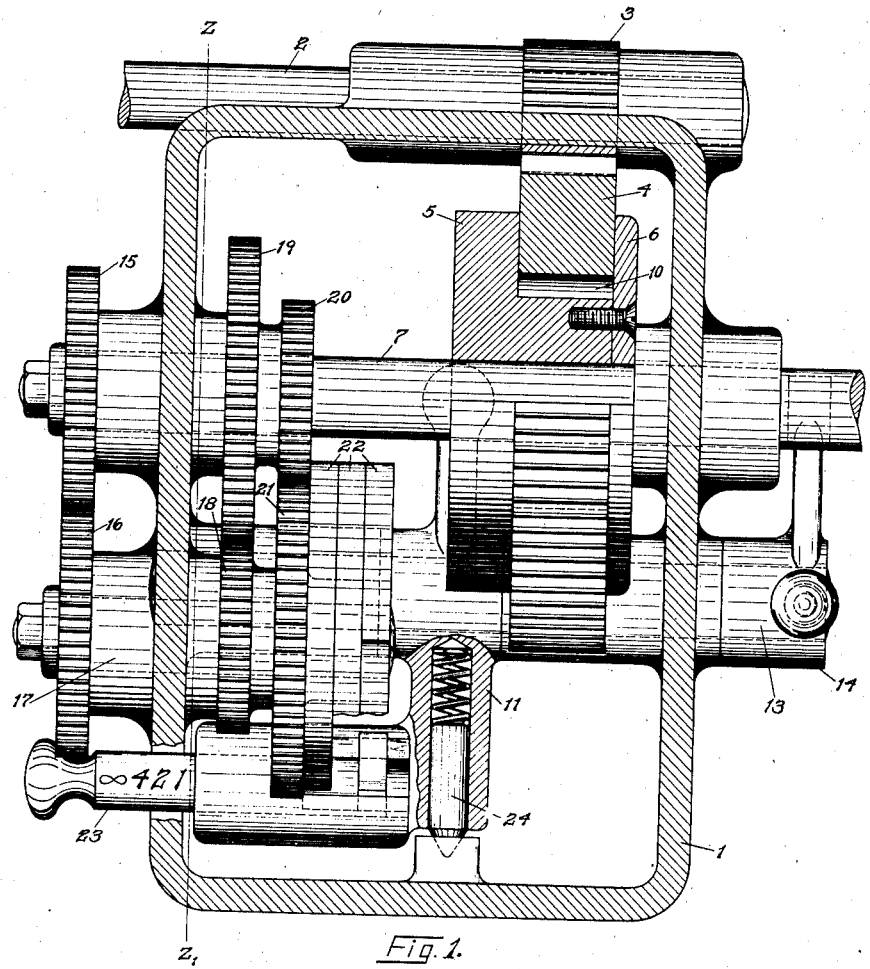
Figure 2:
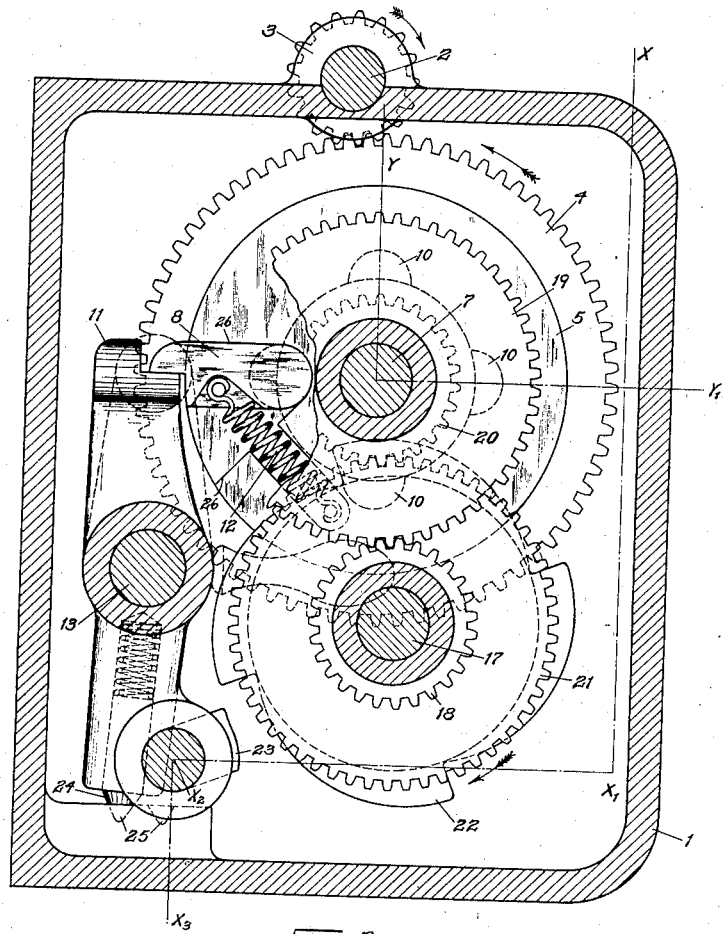
Figure 3:
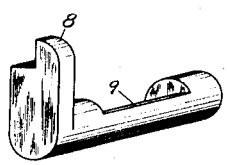

In the accompanying drawings Figure 1 is a front elevation with the casing broken away at the line X X¹ X² X³, Fig. 2 is a side elevation of the section at the line Z Z of the invention in its preferred form. Fig. 3 is the clutch latch in perspective.

Referring to Fig. 1: The casing 1 incloses the greater part of the mechanism, 2 is a constantly rotating shaft, which we will term the primary shaft, upon which is suitably secured a driving pinion 3 engaging with a driven gear 4 loosely mounted on, and concentric with a clutch disk 5, the said clutch disk 5 secured to a secondary shaft 7, and a flange 6 secured to said clutch disk 5, to retain the driven gear 4. The said secondary shaft 7 can be connected with any other mechanism it is desired to operate with the invention. Referring to Figs. 2 and 3, rotatably mounted within the said clutch disk 5 at a distance from the center is a latch having a portion of its shank cut away at 9 equal in width to the driven gear 4, to allow the said driven gear 4 to revolve freely upon the said clutch disk 5. The clutch disk 5 has a depression upon its face, the sides of which form the abutments 26 for the latch 8. The driven gear 4 has concave recesses 10 to engage with the latch 8, the clutch disk 5 is held stationary by means of the lever 11 holding latch 8 out of engagement with the recesses 10 in the driven gear 4 and thereby holding the secondary shaft 7 stationary. By withdrawing the lever 11, the latch 8 is released and the spring 12 draws the latch 8 forward until it strikes the abutment 26 so that the cut away portion of the shank of the latch 8 lies within the path of one of the recesses 10, and thus positively coupling the constantly rotating primary shaft 2 with the secondary shaft 7, said secondary shaft thus receives an intermittent motion at predetermined intervals, the said intervals controlled by the lever 11. The lever 11 is secured to a rock shaft 13 and upon one end of said rock shaft 13 is secured a second lever 14, adapted to be either automatically or manually controlled. The lever 11 is held in either position by means of a spring-controlled plunger 24, operating in the provided spaces 25.

To control the number of rotations of the secondary shaft 7, or to time the uncoupling of the secondary shaft 7 from the primary shaft 2, a positive mechanism is shown, and consists of a change gear 15 mounted upon the end of the secondary shaft 7 engaging with a second change gear 16 mounted upon the end of a shaft 17, upon which is secured a gear 18 engaging with a gear 19, the said gear 19 being secured to gear 20 the double gears 19 and 20 being loosely mounted upon the secondary shaft 7, or on any other suitable stud. The said gear 20 engages with a sleeve gear 21, loosely mounted on the shaft 17 and secured to the said sleeve gear 21 are a series of cams 22 each having a different number of lobes. The cams 22 control the lever 11 by means of a sliding cam 23, sliding longitudinally in the said lever 11 and adapted to engage with either of the cams 22, when it is desired to intermittently rotate the secondary shaft 7, or it does not engage with any of the cams 22 when continuous motion of the secondary shaft 7 is desired.

The operation of the mechanism is as follows: The primary shaft 2 is connected to any constantly rotating shaft, the pinion 3 secured thereon driving the gear 4 continuously. When the lever 11 is withdrawn from the latch 8, the said latch 8 is drawn forward by means of the spring 12 until it strikes the abutment 26 in the clutch disk 5, and engages with the next approaching aperture 10 in the driven gear 4, thus positively connecting the primary shaft 2, with the secondary shaft 7. The change gear 15 receives its motion from the secondary shaft 7 and the said change gear 15 engaging with the change gear 16 rotates the shaft 17, and the gear 18 secured thereon. The said gear 18 engages with the double gear 19 and 20 loosely mounted upon the secondary shaft 7 and the gear 20 of said double gear drives the cams 22, through the gear 21. Assuming the sliding cam piece 23 in the path of the cam having 4 lobes, the structure as shown being arranged with one, two and four lobed cams, and ratio of gearing 18, 19, 20, 21 being as 1 to 4 and the change gears 15 and 16 as 1 to 1, the lever 11 will be forced into the path of the latch 8 just before the secondary shaft 7 completes its first rotation. The sliding cam 23 remaining in this position, each time the lever 11 is withdrawn the secondary shaft 7 will make one rotation and then be uncoupled. The sliding cam has the number of the lobes stamped on one end to show which cam it is engaging. By moving the sliding cam 23 into the path of the cam having 2 lobes, the change gears 15 and 16 remaining 1 to 1, the secondary shaft 7 will make two rotations, between the disengaging and engaging of the latch 8. By changing the gears at 15 and 16 making a ratio equal to 1 to 2 the secondary shaft would make 2, 4 and 8 rotations respectively. 1 to 3 ratio would give 3, 6 and 12, &c.

The cams 22 must have lobes, whose numbers are factors of the ratio of the gearing at 18, 19, 20, 21, so as to make complete rotations of the secondary shaft 7 before the disengaging of the latch 8.

The above combination can be altered to produce any desired results.

Having described my invention, and the manner in which it is operated, I claim as new, and wish to secure by Letters Patent:

1. The combination of a driven gear, a driving gear, a clutch disk, a latch mounted within said clutch disk arranged to engage with said driven gear, and means to engage and disengage said latch.

2. The combination of a driven gear, a driving gear, a clutch disk mounted within said driven gear, a latch mounted within said clutch disk arranged to engage with said driven gear, and means to engage and disengage said latch.

3. The combination of a driven gear, a driving gear, a clutch disk, a latch mounted within said clutch disk and said driven gear arranged to engage with said driven gear, and means to engage and disengage said latch.

4. The combination of a driven gear, a driving gear, a clutch disk, a latch rotatably mounted within said clutch disk arranged to engage with said driven gear, and means to engage and disengage said latch.

5. The combination of a driven gear, a driving gear, a clutch disk, a latch having a cylindrical shank arranged to engage with said driven gear, and means to engage, and disengage said latch.

6. The combination of a driven gear, a driving gear, a clutch disk mounted within said driven gear, a latch having a cylindrical shank rotatably mounted within said clutch disk and said driven gear arranged to engage with said driven gear, and means to engage and disengage said latch.

7. The combination of a driven gear, a driving gear, a clutch disk, a latch mounted within said clutch disk at a distance from the center of said clutch disk arranged to engage with said driven gear, and means to engage and disengage said latch.

8. The combination of a driven gear, a driving gear, a clutch disk, a latch rotatably mounted within said clutch disk at a distance from the center and within said driven gear arranged to engage with said driven gear, and means to engage and disengage said latch.

9. The combination of a driven gear, a driving gear, a clutch disk, a latch rotatably mounted within said clutch disk having a portion of its cylindrical shank within said driven gear cut away to make said latch inoperative arranged to engage with said driven gear, and means to engage and disengage said latch.

10. The combination of a driven gear, provided with a series of apertures on its inner surface, a driving gear, a clutch disk, a latch mounted within said clutch disk arranged to engage with said apertures of said driven gear, and means to engage and disengage said latch.

11. The combination of a driven gear provided with a series of apertures on its inner surface, a driving gear, a clutch disk, a latch having a portion of its cylindrical shank cut away to disengage from said driven gear rotatably mounted within said clutch disk and arranged to engage with said apertures of said driven gear, and means to engage and disengage said latch.

12. The combination of a driven gear, a driving gear, a clutch disk, a latch mounted within said clutch disk, the said clutch disk having a depression upon its face, the sides of said depression forming abutments to govern the engaging and disengaging of said latch with said driven gear, and means to engage and disengage said latch.

13. The combination of a driven gear, a driving gear, a clutch disk, a latch mounted within said clutch disk, arranged to couple and uncouple said clutch disk, and said driven gear, a lever adapted to engage and disengage said latch.

14. The combination of a driven gear, a driving gear, a clutch disk, a latch mounted within said clutch disk, arranged to couple and uncouple said driven gear and clutch disk, a lever adapted to engage and disengage said latch and means to make said latch operative when disengaged by said lever.

15. The combination of a driven gear, a driving gear, a clutch disk, a latch mounted within said clutch disk, means to engage said latch with said driven gear, whereby said driven gear is coupled to said clutch disk, a lever adapted to disengage said latch from said driven gear, thereby uncoupling said clutch disk and driven gear.

16. The combination of a driven gear, a driving gear, a clutch disk, a latch mounted within said clutch disk arranged to couple and uncouple said driven gear and clutch disk, means comprising a lever adapted to effect said coupling and uncoupling.

17. The combination of a driven gear, a driving gear, a clutch disk, a latch mounted within said clutch disk, a spring or the like to engage said latch with said driven gear, whereby said driven gear is coupled to said clutch disk, a lever adapted to disengage said latch from said driven gear thereby uncoupling said clutch disk and driven gear.

18. The combination of a driven gear, a driving gear, a clutch disk, a latch mounted within said clutch disk arranged to couple and uncouple said driven gear and clutch disk, a rock shaft, a lever mounted on said rock shaft adapted to engage and disengage said latch a second lever mounted on said rock shaft to control the first said lever.

19. The combination of a constantly rotating driving gear, a driven gear, a secondary shaft, a clutch disk secured to said secondary shaft, a latch mounted within said clutch disk arranged to couple and uncouple said driven gear and secondary shaft, and mechanism to control said coupling and uncoupling.

20. The combination of a driven gear, a driving gear, a secondary shaft, means comprising a latch to couple and uncouple said driven gear and secondary shaft, and positive mechanism to control said uncoupling.

21. The combination of a driven gear, a driving gear, a clutch disk, means comprising a lever and a latch adapted to couple and uncouple said driven gear and clutch disk, and positive mechanism to automatically control said lever thereby controlling the uncoupling of said driven gear and clutch disk at a predetermined time.

22. The combination of a driven gear, a driving gear, a secondary shaft, means comprising a latch to couple and uncouple said driven gear and secondary shaft, and positive mechanism actuated by said secondary shaft to control said uncoupling.

23. The combination of a driven gear, a driving gear, a secondary shaft, a clutch disk, secured to said secondary shaft, a latch mounted within said clutch disk arranged to couple and uncouple said driven gear and secondary shaft, means comprising a lever adapted to effect said coupling and uncoupling, and positive mechanism actuated by said secondary shaft to control said lever whereby said secondary shaft and driven gear are uncoupled at a predetermined time.

24. The combination of a driven gear, a driving gear, a secondary shaft, means comprising a lever and a latch adapted to couple and uncouple said driven gear and secondary shaft, and positive mechanism actuated by said secondary shaft to control said lever whereby said secondary shaft and driven gear are uncoupled at a predetermined time.

25. The combination of a driven gear, a driving gear, a secondary shaft, means comprising a lever adapted to couple and uncouple said driven gear and secondary shaft, a series of cams, mechanism to actuate said cams, a cam piece mounted in said lever to render said cams individually operative.

26. The combination of a driven gear, a driving gear, a secondary shaft, means comprising a lever adapted to couple and uncouple said driven gear and secondary shaft, a series of cams, mechanism to actuate said cams, a cam piece slidably mounted in said lever to render said cams individually operative.

27. The combination of a driven gear, a driving gear, a secondary shaft, means comprising a lever and a latch adapted to couple and uncouple said driven gear and secondary shaft, means for holding said lever inoperative, and positive mechanism to control said lever thereby uncoupling said secondary shaft and driven gear at a predetermined time.

28. The combination of a driven gear, a driving gear, a secondary shaft, means comprising a lever adapted to couple and uncouple said driven gear and secondary shaft, means for holding said lever inoperative, a series of cams to vary the interval between said coupling and uncoupling, a cam piece mounted in said lever to render said cams individually operative.

29. The combination of a shaft, a driving member, devices comprising a lever adapted to couple and uncouple said shaft and driving member to rotate said shaft at desired intervals, a series of cams to vary the number of rotations of said shaft between said coupling and uncoupling, a cam piece mounted in said lever to render said cams individually operative.

30. The combination of a shaft, a driving member, devices comprising a lever adapted to couple and uncouple said shaft and driving member to rotate said shaft at desired intervals, a series of cams to vary the number of rotations of said shaft between said coupling and uncoupling, a cam piece mounted in said lever to render said cams individually operative, gearing positively connecting said shaft and cams.

31. The combination of a shaft, a driving member, devices comprising a lever adapted to couple and uncouple said shaft and driving member to rotate said shaft at desired intervals, a series of cams to vary the number of rotations of said shaft between said coupling and uncoupling, a cam piece mounted in said lever to render said cams individually operative, gearing positively connecting said shaft and cams, and change wheels to vary the speed ratio of said shaft and cams.

32. The combination of a shaft, a driving member, devices comprising a lever adapted to couple and uncouple said shaft and driving member to rotate said shaft at desired intervals, a series of cams having different numbers of lobes to vary the number of rotations of said shaft between said coupling and uncoupling, a cam piece slidably mounted in said lever to render said cams individually operative, and gearing positively connecting said shaft and cams.

33. The combination of a shaft, a driving member, devices comprising a lever adapted to couple and uncouple said shaft and driving member, to rotate said shaft at desired intervals, a series of cams having different numbers of lobes to vary the number of rotations of said shaft between said coupling and uncoupling, a cam piece slidably mounted in said lever to render said cams individually operative and gearing connecting said shaft and cams having a ratio as one is to the greatest number of lobes in any one cam.

34. The combination of a shaft, a driving member, devices comprising a lever adapted to couple and uncouple said shaft and driving member to rotate said shaft at desired intervals, a series of cams to vary the number of rotations of said shaft between said coupling and uncoupling, gearing connecting said shaft and cams, said cams having different numbers of lobes which are factors of the ratio of said gearing, a cam piece slidably mounted in said lever to render said cams individually operative.

35. The combination of a shaft, a second shaft, a driving member, devices comprising a lever adapted to couple and uncouple said shaft and driving member to rotate said shaft at desired intervals, a change wheel mounted on said shaft, a second change wheel mounted on said second shaft and meshing with aforesaid change wheel, a gear fast on said second shaft, a double gear loosely mounted on said shaft meshing with said gear, a sleeve gear loosely mounted on said second shaft meshing with one of said double gears, a series of cams secured to said sleeve gear and rotatable therewith, a cam piece slidably mounted in said lever to render said cams individually operative.

36. The combination of a constantly rotating driving gear, a driven gear, a secondary shaft, clutch mechanism comprising a latch to positively couple said driven gear and secondary shaft, and mechanism to control said positive coupling.

37. The combination of a constantly rotating driving gear, a driven gear, a secondary shaft, clutch mechanism comprising a latch to couple and uncouple said driven gear and secondary shaft, positive mechanism actuated by said secondary shaft to control said uncoupling.

38. The combination of a driven gear, a driving gear, a clutch disk, a latch arranged to couple said driven gear and clutch disk, a lever to engage and disengage said latch whereby said clutch disk and driven gear are coupled and uncoupled, a spring to make said latch operative when released by said lever.

39. A shaft, a clutch disk secured thereto, a driven gear loosely mounted on said clutch disk, a driving gear, a latch mounted in said clutch disk arranged to engage with said driven gear, a spring secured in said clutch disk and holding said latch under tension, a lever adapted to release or engage said latch whereby said clutch disk and driven gear are coupled and uncoupled, a series of cams to vary the number of rotations of said shaft when coupled to said driven gear before being uncoupled, a cam piece mounted in said lever to make said cams individually operative, and gearing connecting said shaft and cams.

40. The combination of a shaft, a driving member, devices, comprising a lever to couple and uncouple said shaft and driving member to rotate said shaft at desired intervals, a series of cams having different numbers of lobes to vary the number of rotations of said shaft between said coupling and uncoupling, a cam piece slidably mounted in said lever to render said cams individually operative, and gearing connecting said shaft and cams having a ratio in relation to said cams to produce complete rotations of said shaft when any one of said cams is operative.

WILLIAM F. ZIMMERMANN.

Witnesses:
EDWIN C. THURSTON,
GERTRUDE A. FREYGANG.